(12) United States Patent
Arous et al.

(10) Patent No.: US 8,326,805 B1
(45) Date of Patent: Dec. 4, 2012

(54) HIGH-AVAILABILITY FILE ARCHIVING

(75) Inventors: Anthony Arous, Worcester, MA (US);
Chenlan Guo, Rockville, MD (US);
Jeffrey C. Peterson, New Market, MD (US)

(73) Assignee: EMC Corporation, Hopkinton, MA (US)

( * ) Notice: Subject to any disclaimer, the term of this patent is extended or adjusted under 35 U.S.C. 154(b) by 478 days.

(21) Appl. No.: 11/904,892

(22) Filed: Sep. 28, 2007

(51) Int. Cl.
*G06F 17/30* (2006.01)

(52) U.S. Cl. ............................. 707/661; 711/161; 714/1

(58) Field of Classification Search .................. 707/204, 707/661, 999.204; 711/161; 714/1
See application file for complete search history.

(56) References Cited

U.S. PATENT DOCUMENTS

| | | | |
|---|---|---|---|
| 5,666,479 A * | 9/1997 | Kashimoto et al. ............... 714/1 |
| 5,764,972 A * | 6/1998 | Crouse et al. ......................... 1/1 |
| 6,360,331 B2 * | 3/2002 | Vert et al. .......................... 714/4 |
| 6,678,705 B1 * | 1/2004 | Berchtold et al. ............ 707/204 |
| 6,694,447 B1 | 2/2004 | Leach et al. |
| 6,859,834 B1 * | 2/2005 | Arora et al. ................... 709/227 |
| 6,879,995 B1 * | 4/2005 | Chinta et al. .................. 709/204 |
| 6,934,880 B2 * | 8/2005 | Hofner ............................ 714/10 |
| 6,990,533 B1 * | 1/2006 | Creemer ....................... 709/248 |
| 7,080,221 B1 | 7/2006 | Todd et al. |
| 7,082,505 B2 * | 7/2006 | Chen ............................. 711/161 |
| 7,155,465 B2 * | 12/2006 | Lee et al. ............................. 1/1 |
| 7,231,426 B1 | 6/2007 | Hall et al. |
| 7,401,194 B2 * | 7/2008 | Jewell ............................ 711/162 |
| 7,469,325 B2 | 12/2008 | Shibayama et al. |
| 7,546,324 B2 * | 6/2009 | Prahlad et al. ........................ 1/1 |
| 7,624,170 B2 * | 11/2009 | Das et al. ....................... 709/223 |
| 7,689,862 B1 * | 3/2010 | Bharthulwar et al. .......... 714/13 |
| 7,769,862 B2 * | 8/2010 | Singh et al. .................... 709/226 |
| 7,860,824 B2 * | 12/2010 | Suzuki et al. ................. 707/609 |
| 7,865,473 B2 | 1/2011 | Augenstein et al. |
| 7,913,053 B1 | 3/2011 | Newland |
| 7,953,944 B2 * | 5/2011 | Raczynski ..................... 711/161 |
| 8,060,709 B1 * | 11/2011 | Arous et al. ................... 711/161 |
| 2001/0056554 A1 * | 12/2001 | Chrabaszcz ..................... 714/13 |
| 2002/0046215 A1 * | 4/2002 | Petrocelli ...................... 707/200 |
| 2003/0135638 A1 * | 7/2003 | Brabson et al. ............... 709/232 |
| 2003/0172145 A1 * | 9/2003 | Nguyen ......................... 709/223 |
| 2003/0221022 A1 | 11/2003 | Sexton et al. |
| 2004/0143713 A1 | 7/2004 | Niles et al. |
| 2004/0153615 A1 | 8/2004 | Koning et al. |
| 2004/0210608 A1 * | 10/2004 | Lee et al. ....................... 707/204 |
| 2005/0021869 A1 * | 1/2005 | Aultman et al. .............. 709/249 |
| 2005/0086231 A1 * | 4/2005 | Moore ........................... 707/100 |
| 2005/0262495 A1 * | 11/2005 | Fung et al. .................... 717/170 |
| 2005/0267920 A1 * | 12/2005 | Helliker et al. ............... 707/204 |
| 2005/0268156 A1 * | 12/2005 | Mashayekhi et al. ............. 714/4 |
| 2006/0010154 A1 | 1/2006 | Prahlad et al. |
| 2006/0015773 A1 * | 1/2006 | Singh et al. ..................... 714/13 |
| 2006/0059321 A1 * | 3/2006 | Linder .......................... 711/161 |

(Continued)

OTHER PUBLICATIONS

U.S. Appl. No. 11/904,885, filed Sep. 28, 2007, Anthony Arous et al.

(Continued)

*Primary Examiner* — Phuong Thao Cao
(74) *Attorney, Agent, or Firm* — Dergosits & Noah LLP; Todd A. Noah

(57) ABSTRACT

Computer file archiving systems and techniques are described. Various aspects include wide area high-availability file archiving, volume-level management capabilities of archiving systems, and methods and systems for storing file archiving metadata. The methods and systems described can be used individually or in combination.

18 Claims, 5 Drawing Sheets

U.S. PATENT DOCUMENTS

| | | | |
|---|---|---|---|
| 2006/0101196 A1 | 5/2006 | Urmston et al. | |
| 2006/0101197 A1 | 5/2006 | Georgis et al. | |
| 2006/0129537 A1 | 6/2006 | Torii et al. | |
| 2006/0155912 A1* | 7/2006 | Singh et al. | 711/6 |
| 2006/0200506 A1* | 9/2006 | Desimone et al. | 707/204 |
| 2006/0224642 A1* | 10/2006 | Chandhok et al. | 707/204 |
| 2006/0282484 A1* | 12/2006 | Stakutis et al. | 707/204 |
| 2006/0282834 A1 | 12/2006 | Cheng et al. | |
| 2007/0038857 A1* | 2/2007 | Gosnell | 713/165 |
| 2007/0079086 A1 | 4/2007 | Wang et al. | |
| 2007/0094316 A1* | 4/2007 | Rodriguez et al. | 707/205 |
| 2007/0174362 A1* | 7/2007 | Pham et al. | 707/204 |
| 2007/0174660 A1* | 7/2007 | Peddada | 714/4 |
| 2007/0220320 A1* | 9/2007 | Sen et al. | 714/13 |
| 2007/0233828 A1* | 10/2007 | Gilbert | 709/223 |
| 2007/0234293 A1* | 10/2007 | Noller et al. | 717/124 |
| 2007/0266064 A1* | 11/2007 | Debrunner | 707/204 |
| 2007/0266136 A1* | 11/2007 | Esfahany et al. | 709/223 |
| 2008/0010325 A1 | 1/2008 | Yamakawa | |
| 2008/0086480 A1* | 4/2008 | Srivastava et al. | 707/10 |
| 2008/0104408 A1* | 5/2008 | Mayer | 713/178 |
| 2008/0126943 A1 | 5/2008 | Parasnis et al. | |
| 2008/0162599 A1* | 7/2008 | Mittal et al. | 707/204 |
| 2008/0178298 A1 | 7/2008 | Arai et al. | |
| 2008/0263079 A1* | 10/2008 | Soneji et al. | 707/102 |
| 2008/0263297 A1* | 10/2008 | Herbst et al. | 711/161 |
| 2008/0307252 A1 | 12/2008 | Bartley et al. | |
| 2009/0006499 A1* | 1/2009 | Mukhi et al. | 707/204 |
| 2009/0013091 A1* | 1/2009 | Zhang et al. | 709/242 |
| 2009/0043828 A1* | 2/2009 | Shitomi | 707/204 |
| 2011/0137953 A1 | 6/2011 | Bobick et al. | |

OTHER PUBLICATIONS

U.S. Appl. No. 11/904,671, filed Sep. 28, 2007, Anthony Arous et al.
U.S. Appl. No. 11/904,671 Office Action dated Mar. 23, 2010.
U.S. Appl. No. 11/904,671 Office Action dated Jul. 27, 2010.
U.S. Appl. No. 11/904,671 Office Action dated Jan. 3, 2011.
U.S. Appl. No. 11/904,671 Office Action dated Apr. 13, 2011.
U.S. Appl. No. 11/904,885 Office Action Mar. 23, 2010.
U.S. Appl. No. 11/904,885 Office Action Sep. 9, 2010.
U.S. Appl. No. 11/904,885 Office Action Dec. 15, 2010.
U.S. Appl. No. 11/904,885 Office Action May 16, 2011.

* cited by examiner

HIGH-AVAILABILITY FILE ARCHIVING

BACKGROUND OF INVENTION

1. Field of Invention

The technology described relates to computer-based file archiving methods and systems.

2. Discussion of Related Art

Storage of computer files is an important consideration in modern-day computing systems. Computer users and computer systems often create numerous files, such as word processing files and picture files.

Files are often stored on one or more storage resources (e.g., a local hard drive or an attached storage system). For performance reasons, many application programs rely upon relatively fast storage resources to store and retrieve files used thereby. Relatively fast storage is often a more expensive resource than slower types of storage. Thus, file archiving techniques have been developed to archive some of the files used by an application program (e.g., those used infrequently) onto less expensive storage resources, to clear space on the primary storage resource for files accessed more frequently.

The file archiving process can choose which files to move to archived storage based on various factors, such as user preference settings (preferences) relating to the type of files, the size of the files, the frequency of use, or other factors. An example of a file archiving system is the DiskXtender® product available from EMC Corporation of Hopkinton, Mass.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

A file archiving system typically includes a file archiving program loaded on a server. The file archiving program may be configured to manage one or more storage volumes (e.g., a local disk drive, a logical volume presented by a storage system or logical volume manager, or other storage volume). Each storage volume may have one or more files archived therefrom. When the file archiving program is running on the server (e.g., as a continuously executing background process, or otherwise), it operates to remove a file from the storage volume being managed and transfer the file to a remote archive storage system.

Figure 1:
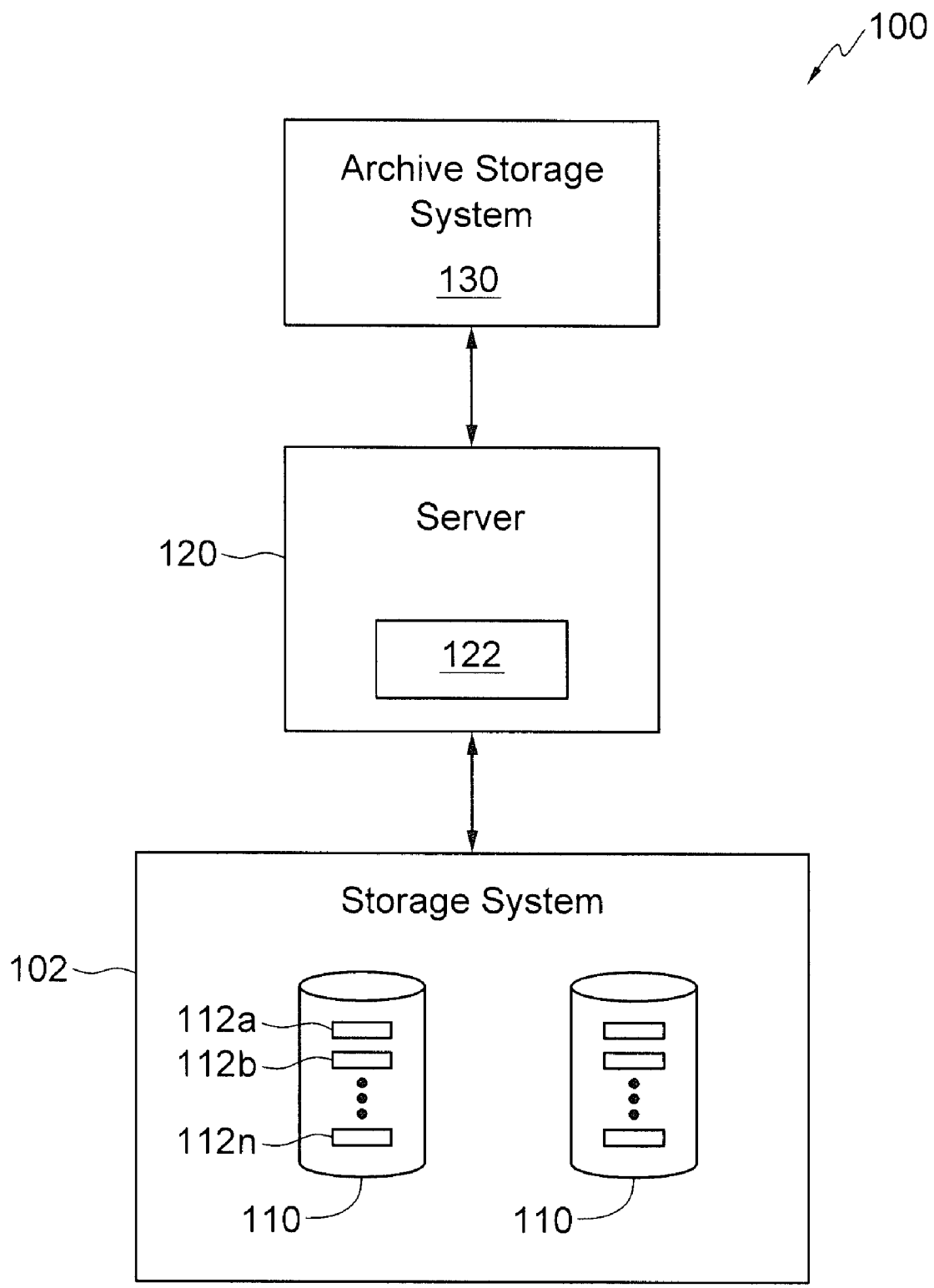
FIG. 1 is a block-diagram of a file archiving system known in the prior art.

An example of a file archiving system is illustrated in FIG. 1. The file archiving system is a computer system 100 comprising storage system 102 that stores one or more storage volumes 110. The storage volume 110 stores files 112a, 112b, . . . , 112n, one or more of which may be archived pursuant to an archive policy. The computer system 100 also comprises a server 120 on which is loaded a file archiving program 122. When file archiving program 122 is executed, it implements an archive policy that determines which of files 112 is to be removed from the storage volume 110 of the storage system 102 and transferred to an archive storage system 130, thereby creating space on the storage volume 110 for other files.

If access is attempted to an archived file, archived file 112 may be restored to the storage volume 110 so that the access may be serviced via the storage system 102. Thus, when the file 112 is archived from storage volume 110, some or all of the file may be removed and replaced by a pointer, stub, or some other identifier which contains a limited amount of information about the file that was archived. In response to a request to access an archived file, the file archiving program 122 can use the identifier to retrieve the archived file 112 (or portion thereof) and return it to the storage volume 110.

The following sections I-III describe several techniques that Applicants have developed related to archiving systems. It should be appreciated that the techniques described herein each may be used separately, all may be used together in a single system, or any combination of two or more techniques may be used together.

I. Wide-Area High-Availability Archiving

Applicants have recognized that in some circumstances it may be desirable to provide high-availability functionality for a file archiving system. High-availability refers to a capability that, when one of the components of a computer, such as a server, becomes inoperable, impaired, or inaccessible, functionality provided by that component may continue to be available.

High-availability functionality is sometimes provided by high-availability clustering programs (sometimes referred to as Automatic Availability Managers—AAM), which offer failover and failback capabilities. Failover refers to the ability to move resources from a failing or failed server to another server. Failback refers to a failover operation that moves resources back to the server on which those resources were originally located, and from which they were removed during a failover operation, after proper operation of the failed server has been restored. Therefore, a high-availability clustering program may ensure that resources are available to a system or user in the event that a server originally executing a program or a service becomes inoperable or inaccessible. One example of a high-availability clustering product is AutoStart™, available from EMC Corporation. However, it should be appreciated that the aspects of the present invention described herein relating to providing high-availability for an archiving program are not limited to use with the AutoStart™ high-availability clustering product, and can be used with any high-availability system.

In the context of file archival, it is desirable to provide failover and failback capabilities so that if storage devices on which archived files are stored become unavailable and/or if one or more servers executing a file archiving program become unavailable, the file archiving capability can be maintained, so that archived files can be retrieved. This can include transferring the file archive program to a second server within a high-availability cluster when the server on which it is executing becomes unavailable. That way, the file archiving functionality is not lost when the first server is shut down, either expectedly or unexpectedly.

While some high availability capabilities have been provided for file archiving systems, they have been limited to local networks. Applicants have recognized that it may be desirable to provide high-availability file archiving functionality over a wide-area network. Enterprises (e.g., businesses, institutions, etc.) often have multiple servers connected via wide-area networks, with the servers being separated by great distances. In some situations, the servers may be located on a global network which connects components in different countries. In accordance with one embodiment, failover and failback capabilities are provided for a file archiving system across a wide-area network. While several illustrative implementations of this aspect of the invention are described below, it should be appreciated that this aspect of the invention is not limited to these implementations, as others are possible.

Figure 2:
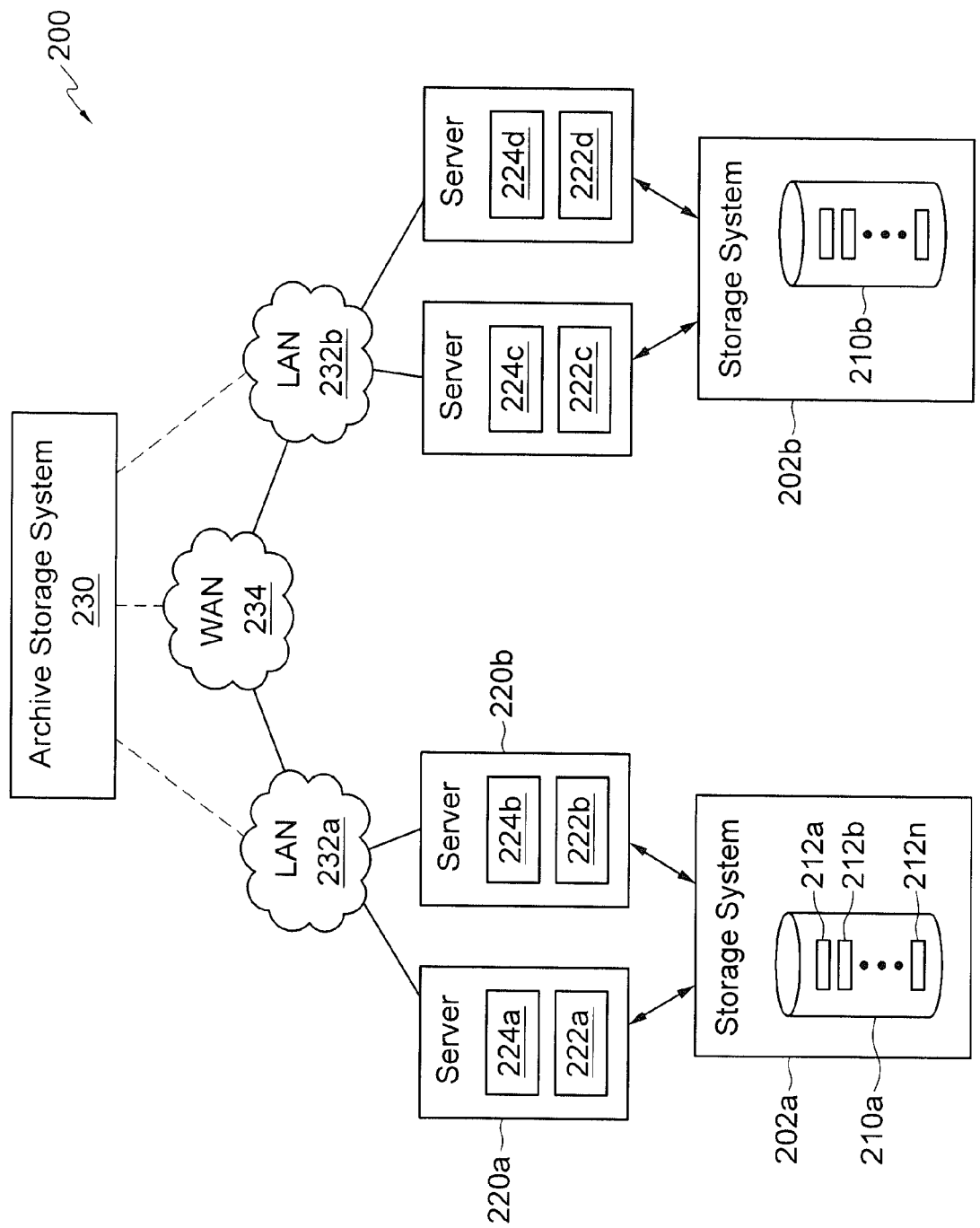
FIG. 2 is a block diagram of a high-availability file archiving system according to one embodiment.

FIG. 2 is a block diagram illustrating one example of a system providing a file archiving system with wide-area failover and failback capabilities. A computer system 200 comprises multiple servers 220a, 220b, 220c, and 220d. While four servers are shown by way of example, any number of two or more servers may be used. Some of the servers 220a, 220b, 220c, and 220d can be connected over a local-area network (LAN) and others over a wide-area network (WAN). In the example of FIG. 2, servers 220a and 220b are connected to each other via a first LAN 232a and are located at a first geographic location, while servers 220c and 220d are connected to each other via a second LAN 232b, and are located in a second geographic location. The locally connected groups of servers can be coupled together via a WAN 234, with servers 220a and 220b being located on a first IP subnet of the WAN 234 and servers 220c and 220d being located on a second IP subnet of the WAN 234. The WAN can be any type of wide area network and may enable the system to include servers coupled thereby that are located at significant geographic distances from each other (e.g., 10 miles or more). In addition, while the particular example provided shows multiple servers at each local location, the invention is not limited in this respect.

To provide failover and failback capabilities, high-availability clustering programs 224a, 224b, 224c, and 224d may be loaded onto the servers 220a, 220b, 220c, and 220d, respectively. The high-availability clustering programs may create a high-availability cluster comprising the servers. For example, the high-availability programs provide the capability to transfer designated programs or services from one server to another within the cluster for any reason (e.g., when the high-availability program detects or receives an indication of a performance problem with the server on which the program or service is executing). The determination to move a program or service may be performed in any suitable way (e.g., in response to a potential disaster situation or other indication that a server may become inoperable or inaccessible), as the invention is not limited in this respect. In the example shown in FIG. 2, the high-availability clustering program is loaded on each of the servers, but it should be appreciated that not all servers (or other resources) in a computer system need to participate in a cluster.

A file archiving program (FAP) that is capable of cooperating with the AAM is loaded onto at least one of the servers. The FAP may take any form, so long as it is capable of cooperating with the AAM to achieve wide area availability. In the embodiment shown in FIG. 2, an instance (222a-d) of a FAP is loaded onto each of the servers in the system, but it should be appreciated that the invention is not limited in this respect, and that only a subset of the servers may have an instance of the FAP loaded thereon.

In one embodiment, the servers may be configured in an active-active set-up. This means that the FAP 222 on each server is executing at all times, even on servers that are not actively archiving files for any storage volume, but may serve as a target location for the AAM to move the functionality of the FAP in the future. Use of an active-active configuration reduces transfer time of the file archiving capabilities from a first server to a second server within the cluster because the FAP on the second server does not need to be started since it is already executing. However, it should be appreciated that the invention is not limited in this respect and may be used where a FAP is not active on a server when not archiving files, but can be activated (e.g., installed and started) by the AAM when needed.

The computer system 200 also comprises a storage system 202a comprising at least one storage volume 210a, which stores files 212a, 212b, . . . , 212n. The FAP 222a loaded on server 220a may be configured to manage storage volume 210a. Management of the storage volume may include: (1) archiving files from the storage volume and storing them on an archive storage system, (2) retrieving archived files from the archive storage system and putting them back onto the storage volume, and (3) generating and/or maintaining metadata that facilities the retrieval of archived files. For instance, the operation of archiving files may comprise moving a file from the storage volume 210 to an archive storage system 230, and replacing the archived file on the volume with an identifier that will facilitate its retrieval. Metadata may be generated or maintained that enables the identifier to be used to retrieve an archived file from the archive storage system 230. The servers 220 may be coupled to the archive storage system 230 through a LAN (e.g., LAN 232a or LAN 232b), a WAN (e.g., WAN 234), or any combination thereof, as indicated by the dashed lines.

When executed, the FAP 222a performs one or more of the described archiving capabilities on the storage volume 210a of storage system 202a. In response to any suitable conditions, examples of which are described above (e.g., the high-availability program or some other entity detecting a problem with the server 220a or the storage system 202a), the high-availability program 224a may transfer at least some capabilities of the FAP 222a for the at least one storage volume 210a from the first server 220a to another server in the cluster. In one embodiment, when the detected problem is with the server 220a but no problem is detected with storage system 202a, the functions of the FAP may be transferred to server 220b. In one embodiment, the full functionality of the FAP may be transferred, and the high-availability program 224b may provide a signal to FAP 222b indicating that it should assume execution of all of the transferred capabilities. Since the second server 220b has access to the first storage volume 210a (via a LAN or any other appropriate connection), the FAP 222b can resume providing archiving services for storage volume 210a with minimal or no interruption in the archiving services.

In an alternate embodiment, less than the full services of the FAP may be transferred. For example, it should be appreciated that the biggest loss of convenience when the FAP server goes down temporarily is the ability to retrieve archived files. Thus, in one embodiment, when the FAP server goes down, the ability to retrieve is transferred. However, while it may be optimal to allow the new server to continue archiving, additional files for the storage volume, in some embodiments it may be desirable to just allow the new server to perform retrieval of archived files, particularly if the loss of the first FAP is temporary and the first server is expected to be back online soon.

In the example above, the FAP is transferred to another server within the cluster that is on the same LAN. However, in some circumstances, it may be desirable to have the high-availability program 224a transfer at least some capabilities of the FAP 222a for the at least one storage volume 210a from the first server 220a across the WAN to another server not in the same geographic location or on the same IP subnet (e.g., server 220c). The transferred capabilities may comprise all of the capabilities or a subset thereof (e.g., an ability to retrieve files archived by the FAP 222a while executing on the first server 220a), as discussed above.

To provide archiving services for the storage volume, the server 220c should have access to the data thereon. This can be achieved in any suitable way. For example, the system can provide access from server 220c to storage device 202a over the WAN. However, in alternate embodiments, the data in the storage volume is replicated or moved so it is on a storage system (e.g., 202b) local to the server 220c for performance reasons and/or to allow failover if storage system 202a fails or is unavailable. A replica storage volume may comprise a mirrored storage volume, a transferred storage volume, or any type of storage volume whose content is at least partially a duplicate of that in another storage volume of the system. This can be done in any suitable way. For example, the system can move or migrate data in response to failure of server 220a or storage system 202a, or can do it in advance. The system can move or migrate data in any suitable way. In one embodiment, data can be moved or migrated using a remote hardware mirroring facility, but other techniques are possible. For example, in one embodiment, a storage system 202b is also provided, and comprises at least one storage volume 210b. Storage systems 202a and 202b can be connected in a source-target hardware mirroring relationship. For example, the storage systems may be configured to provide data replication from one storage system to the other, for instance from storage system 202a to storage system 202b. An example of a hardware mirroring facility that provides such a capability is the Symmetrix Remote Data Facility (SRDF), available from EMC Corporation. However, the embodiments of the invention described herein are not limited to using the SRDF, as other remote mirroring facilities, or other data migration or replication technologies, can be employed.

Server 202c may have access to the storage system 202b which comprises storage volume 210b by a LAN or any other appropriate connection. Because storage volume 210b is configured in a source-target mirroring relationship with storage volume 210a, it contains copies of the files that existed on storage volume 210a. Therefore, FAP 222c can begin managing storage volume 210b without any loss of data resulting from the transfer of capabilities from server 220a to server 220c.

In one embodiment, the high availability system employs the concept of virtual resource (e.g., server) names, although the invention is not limited in this respect, as the techniques described herein can be used with any type of high availability system. It should be appreciated that various components of the computer system 200 may communicate with the FAP managing a storage volume. Communication with the FAP may occur using an identifier that associates the FAP with a given server name. The high-availability system may assign a virtual server name for one or more resources, such as the file archive program. The virtual server name may be mapped by the high availability system to one of the servers in the cluster, and may be transferred from one server to another to effectuate a transfer of a program or service from one server to another. In this manner, a component of the computer system desiring to communicate with the FAP responsible for a particular storage volume may do so using the virtual name, and mapping and remapping of that virtual name may be done by the high availability system in a manner transparent to the other components in the system, which will be unimpacted by the FAP being transferred from one server to another.

When it is determined (in any suitable way, as discussed above) that the high-availability program 224a should transfer at least some of the file archiving capabilities from one server (e.g. server 220a) to another (e.g., server 220c) within the cluster, it may implement the transfer in any suitable way. An example of a transfer routine will now be described, but it should be appreciated that other routines (e.g., with other acts or performed in different orders) are possible. Initially, the high-availability program 224a may send a stop signal to FAP 222a on server 220a. The FAP 222a then stops performing any archiving functions. In one embodiment discussed below, this stopping can be instructed and performed on a storage volume by storage volume basis, but the invention is not limited in this respect, as the performance of the FAP can alternatively be stopped for all files or for any subset thereof. Next, write access to storage volume 210a may be disabled. The virtual server name, if any, given to the server 220a may then be removed.

The FAP 222c on server 220c may then be prepared to assume the file archiving operations. To accomplish this, the virtual server name, if any, may be assigned to the target server (e.g., server 220c) by the high-availability program. In the embodiment where the volume being managed by the FAP is mirrored and available on another storage system (e.g., 202b local to the server) to which the FAP is being relocated, FAP 222c may be granted write access to the new storage volume 210b. Otherwise, the data for the storage volume may be replicated or moved to a storage location that is accessible to the server to which the file archive program is being relocated. Program 222c may then begin monitoring data related to the file archiving function, such as user preferences or other information specifying an archive policy. Finally, a start signal may be sent to FAP 222c (e.g., from the high availability program) directing it to begin archiving functions.

Numerous modifications to the system and method described are possible. For example, the order of loading the high-availability programs and file archiving programs is not limiting. The high-availability programs may be loaded on the servers 220a, 220b, 220c, and 220d prior to loading the FAPs, or vice versa. Moreover, the high-availability programs and the FAPs have been described as distinct, but could be integrated into a single program, or the functionality desired can be implemented among three or more programs.

The storage volumes 210 can be any type of storage volume, as the aspects of the invention described herein are not limited to use with FAPs that manage any particular type of storage volume. For example, storage volumes 210 may be provided on a storage system or other component distinct from the server executing the FAP, and can be a physical disk, a logical volume, or any other type of storage volume. Alternatively, the FAP may be loaded onto a server and manage volumes local to the server (e.g., a disk driver).

The archive storage system 230 can be any type of storage system, as the techniques described herein are not limited to use with a system employing any specific type of storage system for the archive storage. In one embodiment, the archive storage system can be a Centera storage system available from EMC Corporation. The Centera storage system provides a content addressable interface so that the metadata maintained by the FAP for an archived file can include a content address that can be presented to the Centera storage system to retrieve the archived file. However, other types of storage can alternatively be employed, including some that employ interfaces other than a content addressable interface.

Similarly, the files 212 can be any type of files, such as word processing files, presentation files, picture/image files, or music files. The files may be non-changing files that are infrequently accessed. Other types of files may also be used.

II. File Archiving with Increased Flexibility

Applicants have further appreciated that it may be desirable to provide greater flexibility for file archiving systems. With conventional file archiving systems, a FAP may be assigned a group of volumes to manage. If it is desired to begin/cease providing file archive functionality for any one of the volumes they must be acted upon as a group, i.e., the FAP must begin or cease managing for all volumes together and cannot be stopped or started separately at different times for different volumes. Applicants have appreciated that it may be desirable to provide this capability.

Figure 3:
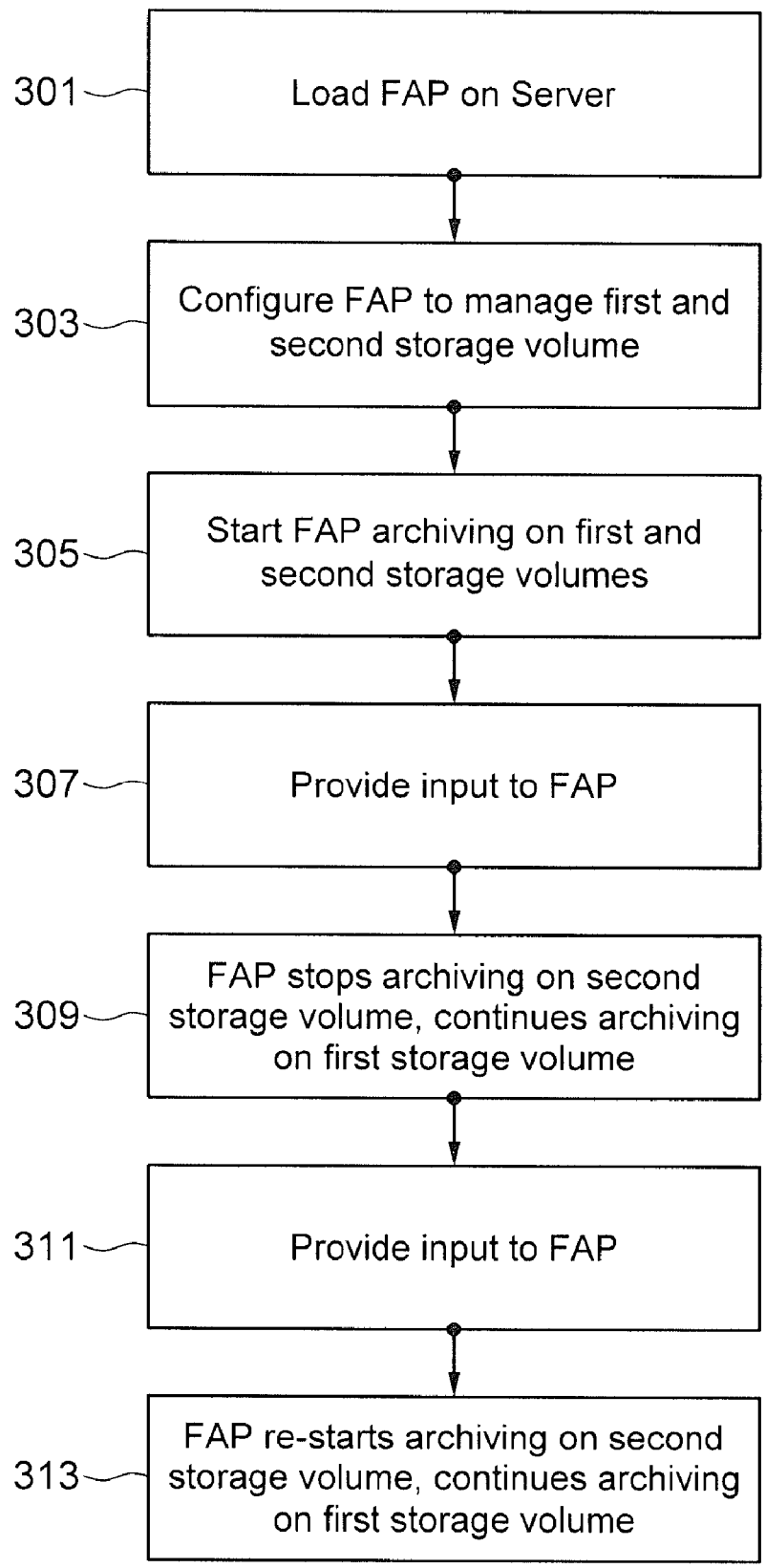
FIG. 3 is a flowchart of a method providing volume-level control in a file archiving system according to one embodiment.

FIG. 3 is a flowchart illustrating one example of a method providing greater flexibility in file archiving systems. However, the invention is not limited to the exact steps, or order of steps, shown in FIG. 3. At step 301, a FAP is loaded on a server. At step 303, the FAP is configured to manage a plurality of storage volumes, comprising a first storage volume and a second storage volume comprising a plurality of files. The FAP may be configured to provide any management functionality desired, such as those previously listed, including but not limited to (1) archiving files from the first and second storage volumes and storing them on an archive storage system, (2) retrieving archived files from the archive storage system and putting them back onto the first and second storage volumes, and (3) generating and/or maintaining metadata that facilities the retrieval of archived files. At step 305, an input is provided to the FAP, in response to which the FAP may begin performing archiving functions on the first and second storage volumes. At step 307, an input is provided to the FAP, in response to which, at step 309, the FAP may cease archiving functions on the second storage volume. For example, the FAP may cease to archive additional files on the second storage volume. Meanwhile, the FAP may continue to archive files on the first storage volume. At step 311, an input is provided to the FAP. In response to the input at step 311, the FAP, at step 313, may restart archiving on the second storage volume while continuing archiving on the first storage volume. Thus, the illustrated method provides one example of volume-level control of archiving functions for a plurality of storage volumes.

Figure 4:
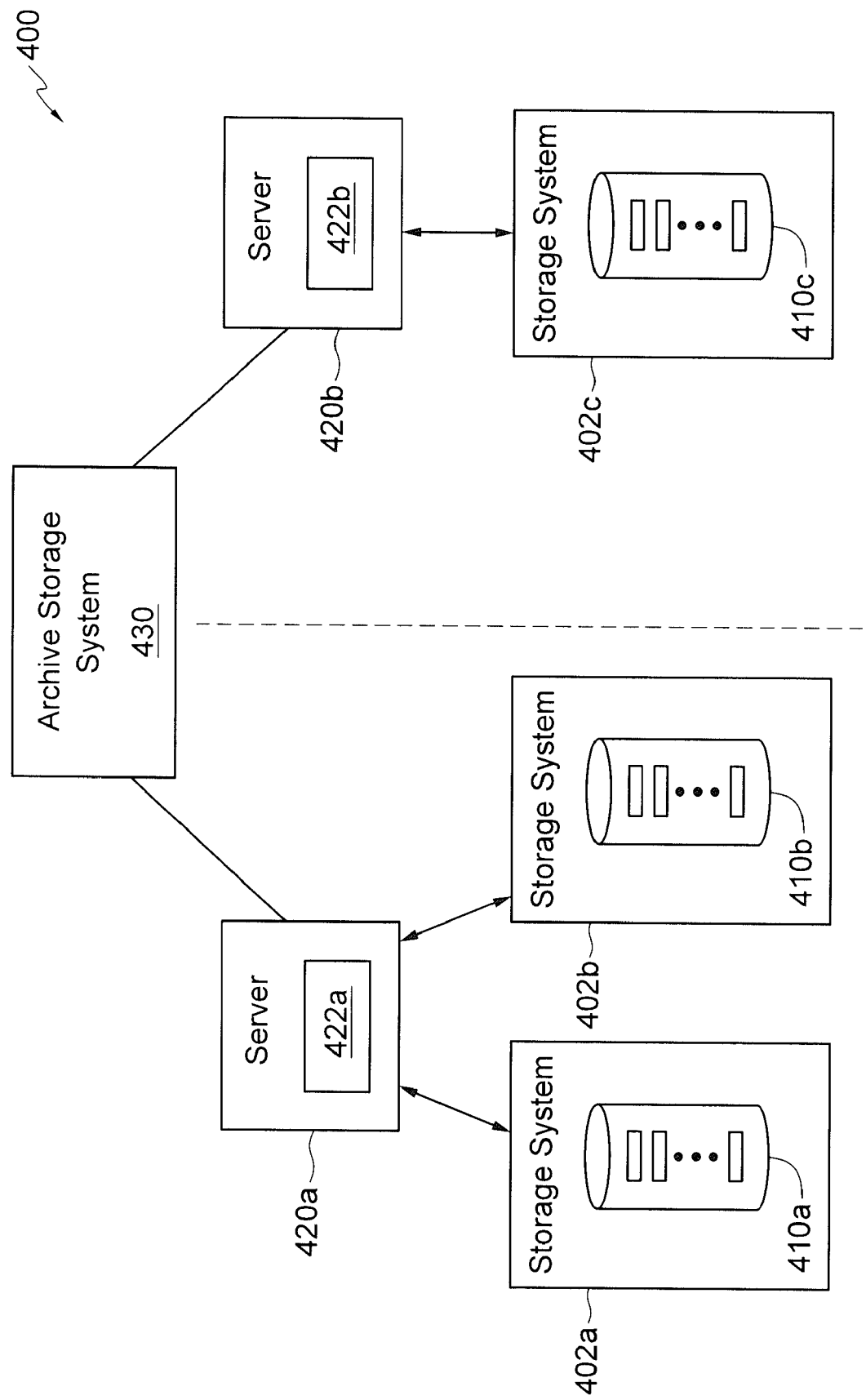
FIG. 4 is a block diagram of a file archiving system according to another embodiment.

FIG. 4 illustrates one example of a computer system 400 in which a FAP having greater flexibility in file archiving functionality is employed to achieve benefits in providing high availability for the FAP. However, it should be appreciated that the file archiving functionality with greater flexibility is not limited to use in conjunction with a high availability program, as it can be used in other types of computer systems.

The computer system 400 includes a plurality of storage systems 402a, 402b, and 402c. Each storage system 402 comprises one or more storage volumes 410. In the example of FIG. 4, each storage system 402 comprises a single respective storage volume 410, although the invention is not limited in this respect, as the aspect of the invention relating to providing a FAP with increased flexibility can be used to manage any number of volumes. Furthermore, as discussed above, this aspect of the invention is not limited to being used in a computer system having any particular number of storage systems, and can be used to allow individual management of volumes on even a single storage system.

The computer system 400 further comprises servers 420a-b on which are loaded instances 422a-b of a FAP. The FAP 422a may be configured to manage both storage volume 410a and storage volume 410b. When executed, the FAP 422a may perform one or more archiving functions on storage volumes 410a and 410b. For example, the FAP 422a may archive at least some of the files on the first and second storage volumes 410a and 410b to an archive storage system 430. As with the embodiments described above, the archive storage system 430 may be any type of archive storage system.

The FAP 422a may be further configured to receive at least one input directing the FAP 422a to undertake one or more actions. The input may come from any source, including an administrator. In one embodiment described below, the FAP is used in systems along with a high-availability manager and the high-availability manager may provide one or more inputs to direct the FAP to take one or more actions as described below.

In one embodiment, the FAP may be instructed to start or stop performance of an archiving function with respect to a subset of the volumes managed thereby. For example, while executing, the FAP 422a may be archiving files from both the first and second storage volumes 410a and 410b, and in response to receiving the at least one input, it may cease archiving additional files from second storage volume 410b, while continuing to archive files from the first storage volume 410a.

The above-described functionality may be achieved in any suitable way, as this aspect of the invention is not limited to any particular implementation. In one embodiment, each instance of the FAP 422 may have the capability to manage groups of one or more volumes together, while managing different groups differently. For purposes of configuring the FAP 422, the plurality of storage volumes 410 may be grouped into various groups, with each group comprising at least one of the plurality of storage volumes 410. The FAPs 422 may be programmed to recognize the boundaries, or delineations, between the defined groups, and be capable of performing different functions on the different groups (e.g., starting to archive files for a group, ceasing to archive files for a group), while managing volumes within a group consistently.

A FAP which can recognize and individually manage volumes enables file archiving to be tailored to any environment. This capability can be leveraged for any number of reasons.

In accordance with one embodiment, the capability of volume-level control can be combined with a high-availability management system to effectively provide a FAP with high-availability, either locally or over a WAN when combined with the techniques described above. In high-availability systems, the transfer of resources from one server to another may be computationally and time intensive. Therefore, reducing unnecessary transfers of resources may be desirable. Partitioning storage volumes managed by a FAP into groups that can be individually recognized and managed may reduce inefficient transfer of resources.

As an example, the volumes managed by FAP 422a may be partitioned into groups which each include at least one volume 410. The FAP can be configured to manage the groups of storage volumes separately so that the FAP can take different actions with respect to storage volumes in different groups. For example, volumes 410a and 410b can be placed in different groups. Thus, if storage volume 410b experiences a performance problem (e.g., storage system 410b fails) which requires that archiving of that storage volume be stopped and the management of the archiving functions for that storage volume be transferred from server 420a to server 420b, there is no need to undertake similar action on storage volume 410a. Specifically, there is no need to stop archiving functions on storage volume 410a and transfer archiving capabilities with respect to storage volume 410a to a different server, as the problem experienced that prompted the transfer of the archiving functions for volume 410b did not impact the ability of the archiving program 422a to continue to perform its archiving functions for volume 410a. Thus, the archiving being performed on storage volume 410a by FAP 422a need not be stopped because of the isolated performance problem impacting storage volume 410b. In accordance with one embodiment of the invention, providing the FAP with the ability to manage (e.g., start and stop) archiving of different volumes separately, the high-availability manager has the ability to make decisions about what resources to relocate in response to a problem, and is not constrained to having to relocate all of the volumes managed by an instance of the FAP whenever it is necessary to relocate any of those volumes as was required for conventional FAPs that do not provide separate volume-level control.

The above-described illustration of one potential benefit of volume-level file archiving control is merely an example, and does not limit this aspect of the invention in any way. Other uses for the volume-level control techniques described are possible (e.g., including in other than high-availability environments), and benefits other than those described may be obtained.

III. Local Storage of File Archiving Metadata

Various types of data and/or metadata are involved in, and utilized by, file archiving systems. The data may be generated during the archiving process by the archiving program itself, may be supplied by an administrator and/or may be created by other means. For example, one type of data involved in file archiving is preference metadata. Preferences provide rules or parameters which a FAP may reference or rely upon in determining which files on a storage volume to archive. Another type of data involved in file archiving is metadata generated during file archival. For example, some file archiving systems generate one or more types of mapping data. As mentioned above, some file archiving systems operate by removing a file (or portion thereof) from a storage volume, storing the file in an archive storage system, and replacing the removed file on the storage volume by an identifier which the FAP can use to determine a location of the associated archived file in the archive storage system. Thus, mapping data may be used to facilitate retrieval of archived files, and a FAP may update its mapping data, if any, each time it archives a file. Other types of data or metadata may also be used by some file archiving systems.

Some FAPs store the data and/or metadata used thereby on the server on which the program executes. For example, when executing on a system employing the Microsoft Windows® operating system, the DiskXtender® file archiving program maintains data of the type described in the operating system registry. The registry fields may correspond to particular types of data. For example, one registry field may correspond to storage volume configuration data. One registry field may correspond to archive storage system configuration data. One registry field may correspond to storage media identification data, used to map storage media identifications to physical locations in an archive storage system. Another registry field may correspond to user preferences. The registry fields may be updated as the FAP operates to archive files on a storage volume.

FAPs frequently need access to the types of data described above. For example, in the case of DiskXtender®, the registry may be accessed to retrieve one or more identifiers for an archived file to facilitate its retrieval. As discussed above, in a high availability environment, the archiving functions performed by an instance of a FAP executing on one server may be transferred to another server. However, depending on the nature of the problem that resulted in the transfer, the data and/or metadata used by the FAP may be inaccessible to the new server. For example, if the FAP stores metadata and/or data in the registry of the server it was executing on and it was a failure of that server that prompted the failover, the registry may be inaccessible. Thus, for example, the new server to which the FAP functionality is transferred may be unable to access the metadata that specified where archived files are stored and may be unable to retrieve them.

According to one aspect of the present invention, a technique is employed to facilitate access to the metadata and/or data used by a FAP. In one embodiment, at least some of the data and/or metadata relating to the archiving of a storage volume is stored on the volume itself. For example, as the FAP manages the archiving of a storage volume and creates and maintains metadata related to the archiving process, at least some of that metadata may be exported to, and stored in, the volume being managed. The metadata may be exported by the FAP, a separate program, or any other suitable technique. If failover of the file archiving function for a volume is to be successful, the new server to which the file archiving functions are transferred will need to access the storage volume (e.g., to restore files to it and/or archive additional files). Thus, by storing any data and/or metadata the FAP relies upon in the volume itself, it can be ensured that the new server that takes over the file archiving functions will have access to it. If needed, at least some of the metadata can be imported back into the FAP, or into a new FAP which assumes management of archiving functions for the source storage volume.

As mentioned above, the metadata may comprise various data related to the file archiving function. In one embodiment, the metadata may comprise one or more types of mapping information which map an identifier stored in a source storage volume to the archive storage system in which the file has been archived. The mapping information may map an archived file to a media identification (media i.d.), which corresponds to a location in an archive storage system (back-end storage system) in which the archived file is stored. The mapping information may further comprise an identifier mapping a media identification to a physical storage location in the archive storage system. In one embodiment, an identifier mapping an archived file to a media identification may be presented to a FAP. The FAP may use further mapping information mapping the media identification to a physical location in an archive storage system to determine the physical location of the archived file. The FAP may then use the physical location of the archived file to retrieve the archived file.

The metadata may further comprise preference settings, or preferences, for the archiving program. The preferences may specify parameters which the FAP refers to in determining which files on a source storage volume should be archived. The preferences may be user defined or provided by any other method. Furthermore, the metadata may comprise information about a storage volume from which files are archived. For example, the metadata may comprise a storage volume name, a storage volume letter, a storage volume serial number, information indicating the capacity of the storage volume, information indicating the type of file system, policies of how and when to archive, the types of files to archive, when to scan the volume, and what media (archive storage system) is used by the volume. Furthermore, the metadata may comprise configuration information relating to an archive storage system, such as the type(s) of storage the FAP is using, the name and location of the storage system, media names and properties, types of file systems, and total and used capacity in the archive storage system. These are examples of the types of metadata to which aspects of the present invention may apply. However, the invention is not limited in this respect, and other types of information may be part of the metadata. In one embodiment, the metadata may contain all configuration information necessary to enable failover and the effective transfer of file archiving capabilities from one server to another server in a high-availability cluster.

Figure 5:
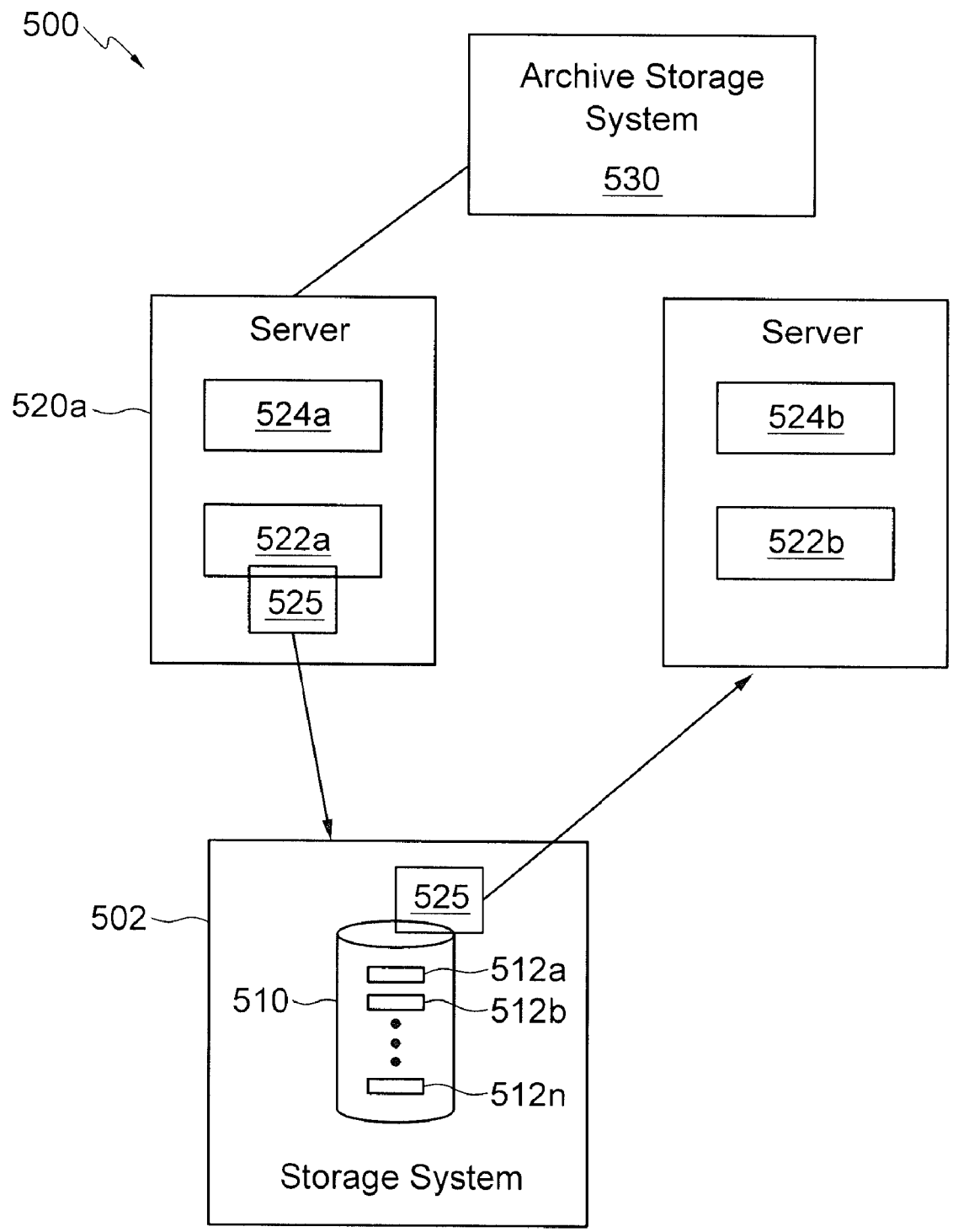
FIG. 5 is a block diagram of a file archiving system according to another embodiment that stores metadata for an archived volume on the volume.

One illustrative implementation of this aspect of the present invention is shown in FIG. 5, which illustrates a portion of a file archiving system. However, it should be appreciated that this aspect of the present invention is not limited to this or any other specific implementation. For example, although the storing of metadata and/or data for a FAP in the volume being managed thereby provides advantages in a high availability system (e.g., either locally or over a WAN) as described above, this aspect of the invention is not limited in this respect, and can be used in systems with no high availability functionality.

The computer system 500 comprises servers 520a and 520b, and a storage system 502. The storage system may comprise one or more source storage volumes 510 which store files 512. The server 520a is loaded with, and executes, a FAP 522a. The FAP may include file archiving capabilities, such as those previously described, including the capability to remove a file 512 (or portion thereof) from the source storage volume 510 and store it in an archive storage system 530.

During archiving of files in the source storage volume 510, the FAP 522a may create and maintain metadata relating to the archiving function. In one embodiment at least some of this metadata may be stored in the registry 525 of the operating system of the server 520a. The registry 525 may comprise various types of data. For example, the registry 525 may comprise data which maps an identifier stored in the source storage volume 510, such as a storage media identification, to the archive storage system 530 to enable an archived file to be retrieved. Thus, if a FAP is presented with a storage media identification it can locate the corresponding archived file.

In accordance with one embodiment, the registry metadata relating to a volume being managed may be exported (e.g., copied) to the storage volume. This can be done in any suitable way. For example, in one embodiment, in response to archiving a first file from the source storage volume 510 to the at least one archive storage system 530, the FAP 522a may store the metadata associated therewith to the source storage volume 510 as well as to the registry. Alternatively, the metadata may be exported to the source storage volume 510 periodically. For example, the registry may be polled for changes to the metadata at some time interval (e.g., approximately every 5 seconds, every 10 seconds, or at any desired time interval), and any changes may be exported to the appropriate storage volume. Alternatively, the FAP, or another relevant application, may be automatically notified of changes to the registry, and any changes may be exported to the appropriate storage volume.

In one embodiment, the registry metadata is exported to the source storage volume by the FAP. Alternatively, in an alternate embodiment for use in a system having a high-availability program 524a loaded on the server 520a, the high-availability program may be responsible for exporting the registry 525 to the source storage volume 510.

Referring again to FIG. 5, the computer system 500 comprises a first server 520a and a second server 520b. The first server 520a and the second server 520b may be part of a high-availability cluster, as they may be loaded with high-availability programs 524a and 524b, respectively.

The FAP 522a on server 520a may be configured to manage the archival of files on source storage volume 510. Accordingly, registry 525 may be periodically exported to source storage volume 510. If a failover occurs, so that at least some capabilities of FAP 522a are transferred to server 520b, the metadata and/or data from registry 525 that had been exported to the storage volume 510 may be imported into server 520b (e.g., into a registry in the operating system of server 520b or elsewhere). Importation of this data and/or metadata from storage volume 510 into the server 520b enables the FAP 522b to take over the file archiving functions with respect to source storage volume 510, without requiring access to server 520a to retrieve the data and/or metadata from the registry 525. Thus, the useful data and/or metadata can be transferred to server 520b even if server 520a experiences a performance problem making it undesirable or impossible to obtain the information from the registry 525 of that server. Therefore, file archiving can proceed on the source storage volume uninterrupted, without any loss of previous archiving functionality. As with the embodiment described above, the full file archiving capabilities can be transferred to the new server and resumed, or only some subset thereof (e.g., the ability to retrieve archived files).

In one embodiment, the registry may comprise information mapping a storage media identification to a physical storage location in an archive storage system. A FAP, upon archiving a file from a storage volume, may store a stub in the storage volume mapping the archived file to a storage media identification. The registry may be exported to the storage volume. If a failover occurs, the registry may be imported to a server assuming the file archiving functionality, such that when the stub is presented to the FAP on the server which assumed the file archiving functionality, that server may access the registry to match a storage media identification to a physical storage location.

Various alterations of the method and system described are possible. In addition, the method of metadata storage described herein may be provide various benefits in addition to those explicitly mentioned, and may be beneficial in systems other than high-availability clusters. Accordingly, this aspect of the present invention is not limited in these respects.

Furthermore, the use of the term "metadata" is not limiting. In this disclosure, the terms "metadata" and "data" have both been used to describe various types of information. It should be understood that the terms may be used interchangeably, and that the term "metadata" may encompass both metadata as well as data, as described herein.

It should be appreciated that one implementation of the embodiments of the present techniques described herein comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement one or more embodiment(s). In addition, it should be appreciated that the reference to a computer program which, when executed, performs the above-discussed functions, is not limited to an application program running on a host computer. Rather, the term computer program is used herein in a generic sense to reference any type of computer code that can be employed to program a processor to implement the above-discussed aspects of the present invention.

It should be appreciated that in accordance with several embodiments wherein processes are implemented in a computer readable medium, the computer implemented processes may, during the course of their execution, receive input manually (e.g., from a user).

Furthermore, it should be appreciated that in accordance with several embodiments, the processes described herein may be performed by at least one processor programmed to perform the process in question. A processor may be part of a server, a local computer, or any other type of processing component, as various alternatives are possible.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The techniques described herein are limited only as defined by the following claims and the equivalents thereto.

What is claimed is:

1. A method comprising:
providing a first server and a second server coupled through a wide area network (WAN);
providing a first instance of a file archiving program on the first server, wherein the first instance of the file archiving program is configured to manage a first storage volume and a second storage volume storing a plurality of files;
providing a second instance of the file archiving program on a second server, wherein the second instance of the file archiving program is configured to manage a third storage volume storing a plurality of files;
archiving, by the first instance of the file archiving program, files from the first storage volume and the second storage volume;
stopping one or more archiving functions on the first storage volume in response to receiving an input, while continuing archiving functions on the second storage volume, wherein the archiving functions include archiving files from the first and second storage volumes to an archive storage system and retrieving archived files from the archive storage system; and
transferring via the WAN at least some of the capabilities of the first instance of the file archiving program for the first storage volume from the first server to the second server, the at least some of the capabilities of the first instance of the file archiving program including an ability to retrieve at least one file that was archived by the first instance of the file archiving program while executed on the first server.

2. The method of claim 1, wherein the first server and second server are located at least 10 miles apart.

3. The method of claim 1, wherein the first server and second server are located on different IP subnets of the WAN.

4. The method of claim 1, wherein the transfer of the at least some of the capabilities of the first instance of the file archiving program from the first server to the second server is performed in response to a detection of a performance problem for the first instance of the file archiving program executing on the first server.

5. The method of claim 1, wherein the at least some of the capabilities of the first instance of the file archiving program further comprises an ability to archive at least one of the files from the first storage volume.

6. The method of claim 5, wherein transferring the at least some of the capabilities of the first instance of the file archiving program comprises providing the second server with at least an ability to archive at least one file from a replica storage volume of the first storage volume.

7. The method of claim 1, wherein the transfer of the at least some of the capabilities of the first instance of the file archiving program is performed by a high-availability clustering program executing on the first server and the second server.

8. A computer system, comprising:
a first server computer including a first instance of a file archiving program loaded thereon, wherein the first instance of the file archiving program is configured to manage a first storage volume and a second storage volume storing a plurality of files, and wherein the first instance of the file archiving program is further configured to archive files from the first storage volume and the second storage volume;
a second server computer including a second instance of the file archiving program, wherein the second instance of the file archiving program is configured to manage a third storage volume storing a plurality of files, and wherein the second server computer is coupled to the first server computer through a wide area network (WAN);
a high availability manager that is configured to provide an input to the first server computer, wherein the first server computer is configured to stop one or more archiving functions on the first storage volume in response to receiving the input, while continuing archiving functions on the second storage volume, wherein the archiving functions include archiving files from the first and second storage volumes to an archive storage system and retrieving archived files from the archive storage system, and wherein the high availability manager is further configured to, in response to at least one event, transfer via the WAN at least some of the capabilities of the first instance of the file archiving program for the first storage volume from the first server computer to the second server computer, the at least some of the capabilities of the first instance of the file archiving program including an ability to retrieve at least one file that was archived by the first instance of the file archiving program while executed on the first server computer.

9. The computer system of claim 8, wherein the first server computer and the second server computer are located on different IP subnets of the WAN.

10. The computer system of claim 8, wherein the at least one event comprises a user command.

11. The computer system of claim 8, wherein the at least one event comprises detecting a performance problem with the first instance of the file archiving program.

12. The computer system of claim 8, wherein the at least some of the capabilities of the first instance of the file archiving program further comprises an ability to archive at least one of the files from the first storage volume.

13. At least one non-transitory computer readable medium, encoded with instructions that, when executed, perform a method comprising:
providing a first server and a second server coupled through a wide area network (WAN);
providing a first instance of a file archiving program on the first server, wherein the first instance of the file archiving program is configured to manage a first storage volume and a second storage volume storing a plurality of files;
providing a second instance of the file archiving program on a second server, wherein the second instance of the file archiving program is configured to manage a third storage volume storing a plurality of files;

archiving, by the first instance of the file archiving program, files from the first storage volume and the second storage volume;

stopping one or more archiving functions on the first storage volume in response to receiving an input, while continuing archiving functions on the second storage volume, wherein the archiving functions include archiving files from the first and second storage volumes to an archive storage system and retrieving archived files from the archive storage system; and transferring via the WAN at least some of the capabilities of the first instance of the file archiving program for the first storage volume from the first server to the second server, the at least some of the capabilities of the first instance of the file archiving program including an ability to retrieve at least one file that was archived by the first instance of the file archiving program while executed on the first server.

14. The at least one non-transitory computer readable medium of claim 13, wherein the transfer of the at least some of the capabilities of the first instance of the file archiving program from the first server to the second server is performed in response to a detection of a performance problem for the first instance of the file archiving program executing on the first server.

15. The at least one non-transitory computer readable medium of claim 13, wherein the first server and second server are located on different IP subnets of the WAN.

16. The at least one non-transitory computer readable medium of claim 13, wherein the at least some of the capabilities of the first instance of the file archiving program further comprises an ability to archive at least one of the files from the first storage volume.

17. The at least one non-transitory computer readable medium of claim 16, wherein transferring the at least some of the capabilities of the first instance of the file archiving program comprises providing the second server with at least an ability to archive at least one file from a replica storage volume of the first storage volume.

18. The at least one non-transitory computer readable medium of claim 13, wherein the transfer of the at least some of the capabilities of the first instance of the file archiving program is performed by a high-availability clustering program executing on the first server and the second server.

* * * * *